E. HARRALSON.
DISPENSING RECEPTACLE.
APPLICATION FILED SEPT. 4, 1914.

1,184,698.

Patented May 23, 1916.

Witnesses

Inventor
Edward Harralson
by Geo. N. Shurtliff Attorney

UNITED STATES PATENT OFFICE.

EDWARD HARRALSON, OF CHARLOTTE, NORTH CAROLINA.

DISPENSING-RECEPTACLE.

1,184,698.

Specification of Letters Patent.

Patented May 23, 1916.

Application filed September 4, 1914. Serial No. 860,195.

*To all whom it may concern:*

Be it known that I, EDWARD HARRALSON, a citizen of the United States, residing at Charlotte, county of Mecklenburg, State of North Carolina, have invented certain new and useful Improvements in Dispensing-Receptacles, of which the following is a specification.

This invention relates to dispensing receptacles.

My object is to provide a receptacle for fluids, powdered, and granulated substances, including toilet and disinfecting powders, salt, pepper, sugar and the like, embodying improvements whereby the receptacle will automatically open for the dispensing of its contents when it is lifted from its support and will, also, automatically close when replaced on any support, such as a shelf or table, thereby obviating the necessity of manually opening the receptacle when its contents are desired, or, closing it after use.

In carrying out my invention I provide a receptacle having a valve or closure controlling the dispensing of its contents, and a spring-actuated false bottom or bottom member movably telescoped over the bottom of the receptacle and operatively connected to the valve or closure and arranged to automatically open the valve or closure when the receptacle is lifted from its support and to automatically close the valve or closure, by the weight of the receptacle, when the latter is again placed in a standing position on a shelf or table.

I wish it understood that my invention can be carried out in connection with a receptacle for holding powdered, granulated, fluid, or semi-fluid material of any kind whatsoever; that the form of, and operating connection for, the valve or closure may be variously modified, and modifications resorted to in the movable bottom or bottom member, all within the spirit and scope of the invention.

Figure 1:
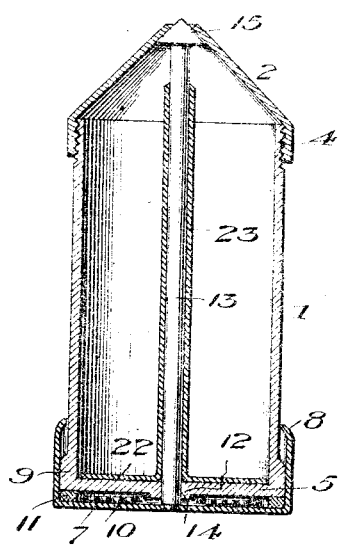
Figure 2:
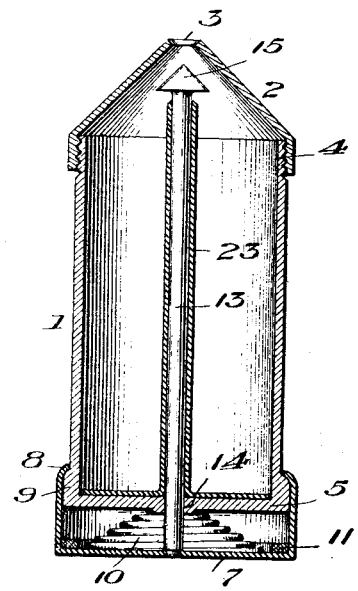

In the accompanying drawings: Figure 1 is a vertical section showing the parts as they appear when the receptacle is resting on any support, such as shelf or table; Fig. 2, a similar view showing the parts as they appear when the receptacle is lifted from its support and is ready for dispensing; and Figs. 3 and 4, views like Figs. 1 and 2, showing a modified valve or closure.

The receptacle 1 may be glass, metal or any desired material and has a conical cap 2 provided with an orifice 3 for the discharge of its contents. The cap may be connected by screw threads 4 as in Figs. 1 and 2, or, be permanently connected as in Figs. 3 and 4. In Figs. 1 and 2, the cap being removable to permit filling of the receptacle, the bottom 5 is preferably integral with the receptacle. In the form shown in Figs. 3 and 4 the permanent connection of the cap necessitates the provision of a removable bottom 6, preferably connected by screw threads.

Referring to Figs. 1 and 2, I provide a false bottom or actuator 7 in the form of a cap which telescopes over the lower end of the receptacle 1 and is provided with an inturned annular flange 8 which coöperates with an enlargement 9 on the receptacle to limit the downward or outward movement of the false bottom in relation to the receptacle. A convolute spring 10, interposed between the bottom 5 and the false bottom or actuator 7, tends to force the latter downwardly or outwardly in relation to the receptacle, as shown in Fig. 2. This spring may be seated inside a rubber gasket 11 contained within the false bottom or actuator 7 and there may be provided a central boss 12 on the bottom 5 surrounded by the smallest coil of said spring. The gasket cushions the receptacle when it is in upright position, as when standing on a shelf or table, for instance. Secured to the false bottom or actuator 7 is a stem 13 which passes through an opening 14 in the bottom 5 and is provided with a valve or closure 15 at its upper end to fit the orifice 3 when the receptacle is resting on a support, as in Fig. 1, thus sealing the receptacle so that air cannot have access to the contents thereof. When the receptacle is lifted, however, the spring 10 immediately forces the false bottom or actuator 7 downwardly, unsealing the aperture 3 and permitting the contents of the receptacle to be dispensed through said aperture (Fig. 2). Immediately the receptacle is placed in upright position on a support, the weight of the parts is sufficient to overcome the strength of the spring 10 and the valve is closed, the parts appearing as in Fig. 1.

Figure 3:
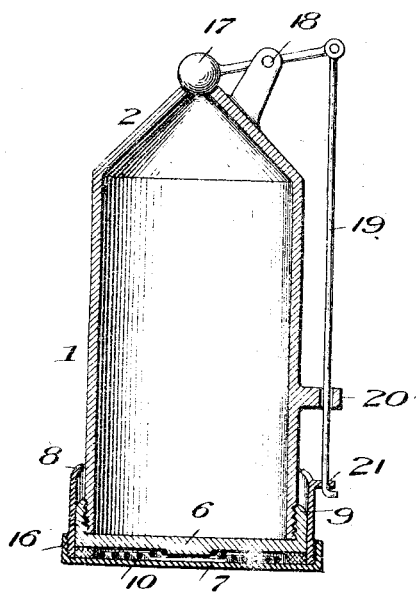
Figure 4:
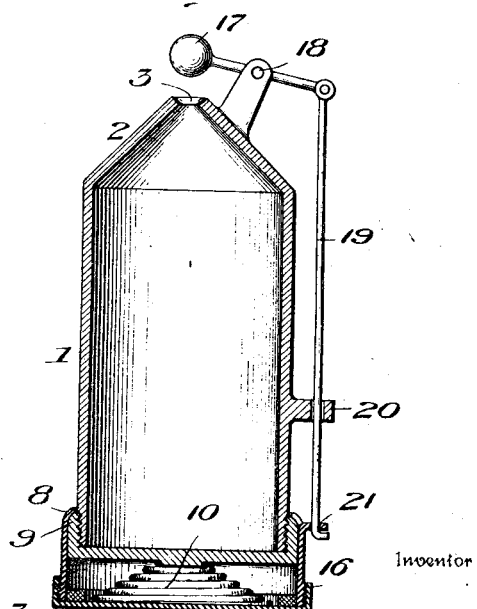

Referring to Figs. 3 and 4, the bottom 6 being removable, the false bottom or actuator is provided with a screw threaded connection 16 by which its two parts may be disconnected to permit the bottom 6 to be removed for purposes of filling the receptacle.

The valve or closure 17 is pivoted at 18 to the cap 2 and actuated by a rod 19 running through an ear 20 on the side of the receptacle and connected at 21 to the flange 8.

While not essential to the construction shown in Figs. 1 and 2, I preferably provide an internal disk 22 which substantially fills the bottom of the receptacle, and a tube or sleeve 23 connected thereto or integral therewith which snugly, yet loosely, surrounds the stem 13 and abuts the bottom of the valve when the latter is down, thus guiding the valve stem and preventing the contents of the receptacle from escaping or clogging at 14.

Having thus described my invention, what I claim as new and desire to secure by Letters Patent is:

The combination with a dispensing receptacle, of a valve or closure controlling the dispensing of the contents of said receptacle, a cup-shaped false bottom or actuator movably telescoped over the bottom of the receptacle and coöperatively related to the valve or closure to cause closing of the valve when said false bottom is resting on a support, and a spring adapted to keep the valve open except when the false bottom is resting on a support.

In testimony whereof, I hereunto affix my signature in presence of two witnesses.

EDWARD HARRALSON.

Witnesses:
JAMES L. MURRILL,
JOHN T. FARDY.